United States Patent [19]
Harper, Jr. et al.

[11] Patent Number: 5,283,982
[45] Date of Patent: Feb. 8, 1994

[54] COMPLEX CONTOUR MILLING MACHINE

[75] Inventors: Jack E. Harper, Jr., Carrollton; John R. Bailleu, Irving, both of Tex.; Scott J. Pleva, Brentwood, England; Ronald C. Smith, Arlington, Tex.

[73] Assignee: LTV Aerospace and Defense Company, Dallas, Tex.

[21] Appl. No.: 861,757

[22] Filed: Apr. 1, 1992
(Under 37 CFR 1.47)

[51] Int. Cl.⁵ .................................. B24B 49/00
[52] U.S. Cl. .................. 51/165.77; 51/166 MH; 51/54; 51/126; 51/128; 51/165.71
[58] Field of Search .......... 51/165 R, 165.71, 165.76, 51/165.77, 165.81, 166 MH, 166 TS, 54, 126, 128, 165.74

[56] References Cited
U.S. PATENT DOCUMENTS

| | | | |
|---|---|---|---|
| 4,178,968 | 12/1978 | Jones | 51/54 |
| 4,603,509 | 8/1986 | Kunieda | 51/31 |
| 4,837,980 | 6/1989 | Rogers | 51/165 R |
| 4,907,371 | 3/1990 | Shoda | 51/165.75 |
| 5,185,967 | 2/1993 | Cutsforth | 51/156 |

Primary Examiner—Bruce M. Kisliuk
Assistant Examiner—Bo Bounkong
Attorney, Agent, or Firm—Arnold, White & Durkee

[57] ABSTRACT

The milling machine disclosed herein offers significant advantages over prior milling machines, particularly in the field of milling composite panels. The structure of the milling machine, having a C-shaped frame with a clamping mechanism that cooperates with roller transfer balls, provides an accurate and stable reference during the milling operation. A vacuum system substantially eliminates the dust produced during the milling operation, so that the machine is cleaner and grinds more accurately. An electrical system, having a retractable bit control and emergency stopping modes, facilitates even more accurate grinding without undesirable results.

40 Claims, 13 Drawing Sheets

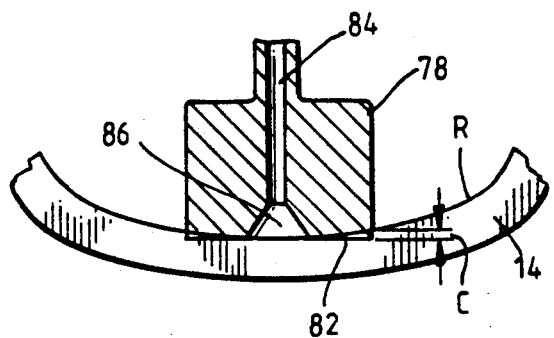
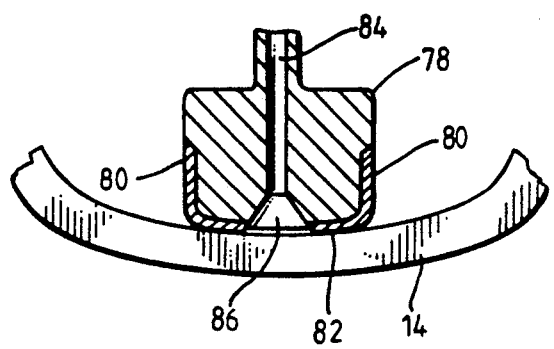
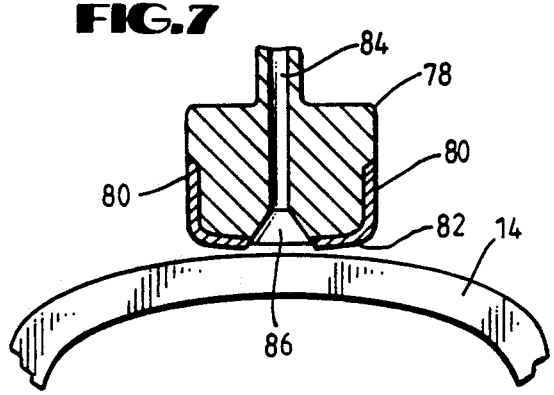
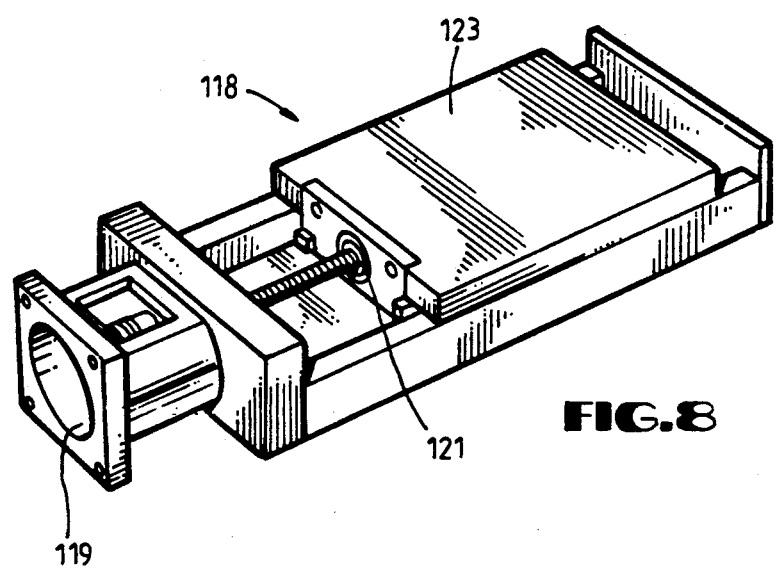

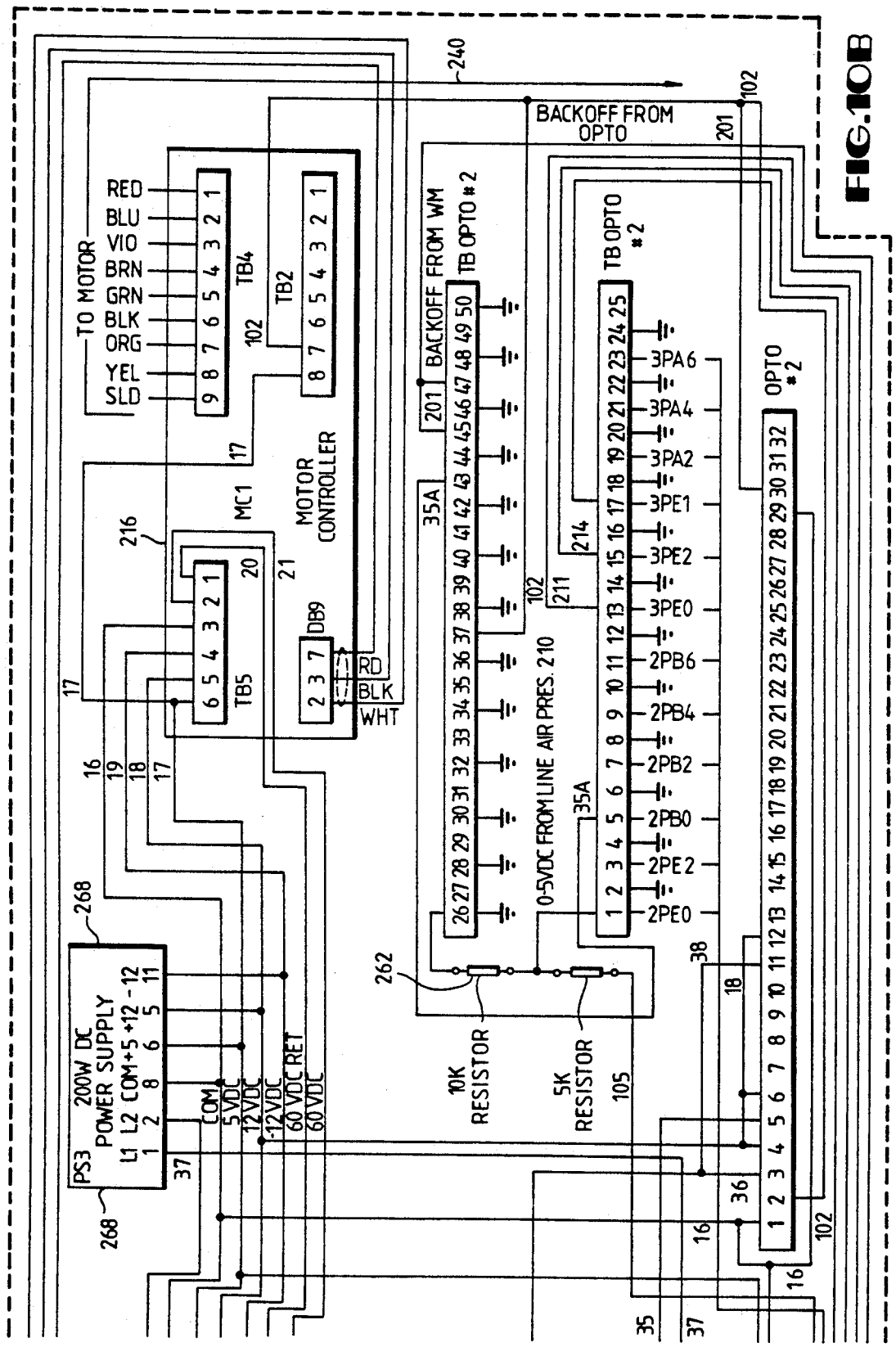

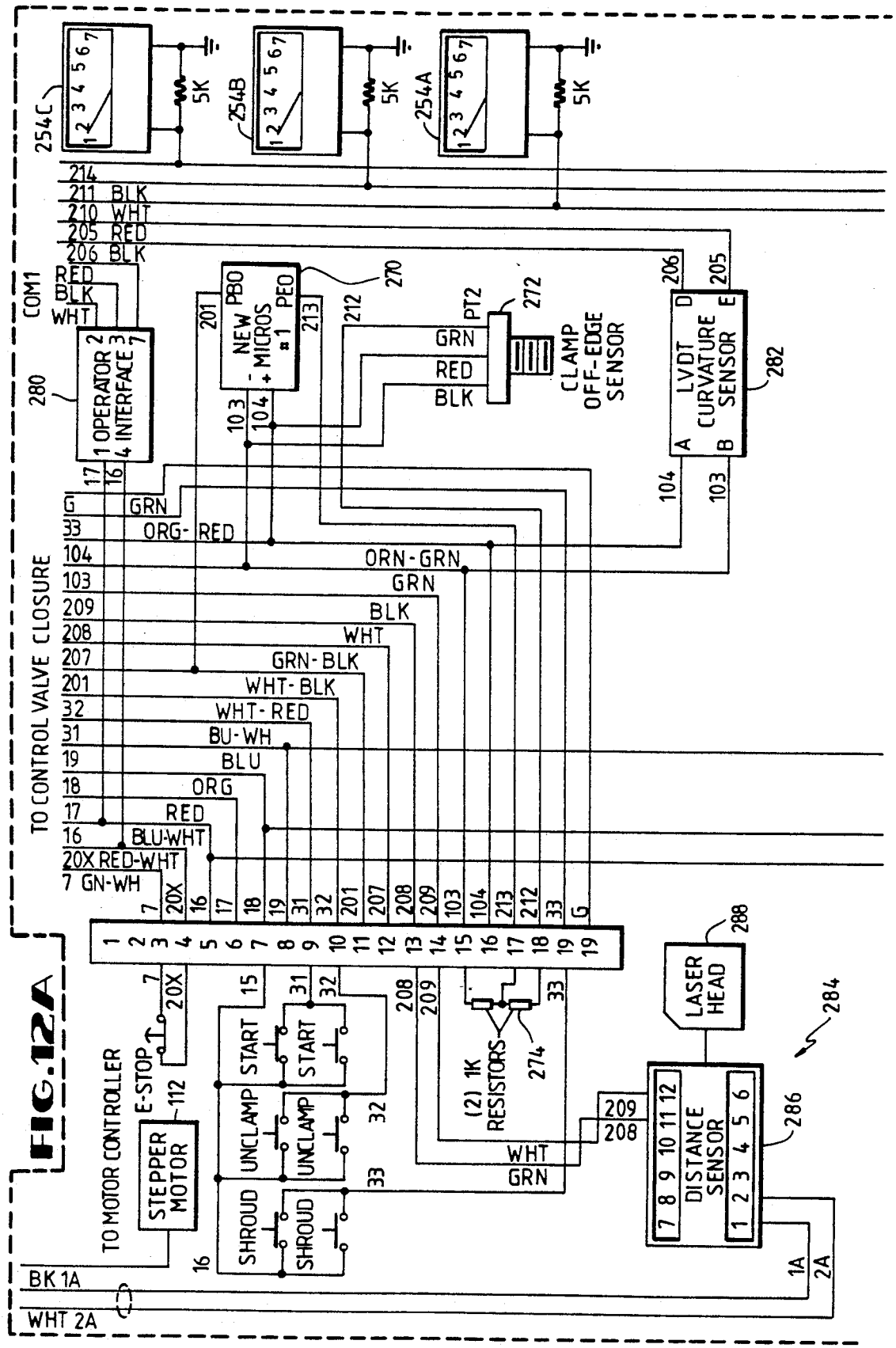

COMPLEX CONTOUR MILLING MACHINE

BACKGROUND OF THE INVENTION

1. Field of the Invention

The present invention relates generally to a milling machine and, more particularly, to a milling machine for milling a panel having complex contours.

2. Description of the Related Art

Many industries are and have been using sheet-like materials having complex contours. Industries use these materials for a wide variety of different purposes. For instance, the automobile industry primarily uses sheet-like, steel body panels. However, an increasing number of automobile body panels are being made from plastic, fiberglass, and composites, such as graphite and kevlar.

The steel sheets, from which steel body panels are formed, are typically produced using a roller press. The thickness of steel sheets formed in such a manner, may be controlled to within strict tolerances. However, plastic, fiberglass, and composite body panels are typically formed using molds. The molding process and any subsequent curing process often introduce irregularities in the thickness of these type body panels. Of course, in industries such as the automobile industry, body panels may vary in thickness without adversely affecting the quality or driveability of the automobile. In other industries, however, the thickness of body panels must be held to within strict tolerances. For instance, airplane manufacturers use composite panels to cover the fuselage and wings of an airplane. Composite panels are lighter and stiffer than steel panels and, thus, appear to be well-suited for use as skin panels on airplanes. However, variations in panel thickness may introduce undesirable stresses along the skin panel.

Due to material and processing variations during lay-up and curing, these large, integrally-stiffened skin panels rarely meet the stringent panel thickness requirements. These requirements are particularly important in fracture-critical zones, such as areas which attach the skin panels to an underlying substructure. The tolerance in these areas is approximately +/−0.010 inches for thickness, with an additional requirement that the waviness of the panel be held to 0.005 inches over any six-inch span.

As alluded to above, these composite panels are manufactured by stacking layers of fabric and tape, and then curing the layered materials in a high temperature/pressure autoclave. Due to variations in the thickness in the composite tape, pressures in the autoclave, and resin buildups or losses during curing, the panels often exhibit unacceptable levels of thickness variation. The thickness of the cured panels is measured to determine areas of undesirable thickness variation. Thereafter, thickness variations are eliminated by stacking more material in low spots and by manually grinding high spots. This process continues until the thickness of the panel is within the prescribed tolerance. This rework typically consists of manually inspecting the edge band with micrometers and pulse echo ultrasonic thickness gauges, and then chalking these readings onto the panel's inner mold line (IML) surface.

Typically, expensive hard tooling jigs and five-axis numerically-controlled machines perform the face milling operation. However, the inaccuracy of these machine tools and part-to-part variation make it nearly impossible to meet the required tolerance levels using these tools.

The present invention is directed to overcoming, or at least reducing the affects of, one or more of the problems set forth above.

SUMMARY OF THE INVENTION

To cure these thickness variations, the present invention includes a stable, stiff milling machine that can position a cutting tool normal to a selected surface of a composite panel. The machine include a C-shaped frame, the upper end of which holds a rotary cutting tool. The cutting tool typically has a diamond-coated cutting face and rotates about a substantially vertical access. The lower end of the C-shaped frame carries three roller balls which are positioned to form a three-point contact opposite the cutting face of the cutting tool. The roller balls establish a plane perpendicular to the rotational axis of the cutting tool, so that as long as the panel maintains contact with the three roller balls, the surface of the panel being milled remains perpendicular to the cutting tool. To maintain the panel in contact with the roller balls, the upper end of the C-shaped frame carries four ball bearing members that are coupled to hydraulic cylinders. After a panel is placed between the roller balls and the cutting tool, the four hydraulically-actuated ball bearing members are lowered into contact with the upper surface of the composite panel. Thus, the panel remains perpendicular to the cutting tool throughout the milling procedure.

During the milling procedure, the milling machine is preferably moved along the composite panel. To help the cutting head remain perpendicular to the composite panel as the milling machine is moved relative to the panel, the milling machine is preferably suspended from an overhead crane by a rod. The upper end of the rod and the lower end of the rod are coupled to a gimbal mechanism, so that the milling machine is universally moveable to adapt to the contours of the panel as the machine moves along the panel. Furthermore, because the dust from the milling procedure can interfere with the milling procedure, the cutting tool and its drive shaft include a longitudinal bore extending therethrough. A vacuum is coupled to this bore, so that the cuttings produced by the milling operation are removed from the panel through the bore.

In accordance with one aspect of the present invention, there is provided a milling machine that includes a C-shaped frame having an upper arm portion and a lower arm portion. A plurality of first roller members are coupled to the lower arm portion of the C-shaped frame, so that they extend upwardly from the lower arm portion toward the upper arm portion. The plurality of roller members are arranged in a preselected configuration to define a reference plane. A cutting head is rotatably coupled to the upper arm portion of the C-shaped frame, so that it extends downwardly from the upper arm portion toward the lower arm portion and is rotatable about an axis substantially perpendicular to the reference plane. A plurality of second roller members are coupled to the upper arm portion of the C-shaped frame, so that they extend downwardly from the upper arm portion toward the lower arm portion and are slidably moveable generally parallel to the axis.

In accordance with another aspect of the present invention, there is provided a vacuum system for a milling machine. This system includes a motor having a rotatable spindle having a first end portion and a second end portion. The spindle has a bore extending longitudinally therethrough. A cutting head is coupled to the first end portion of the spindle, and the cutting head has a bore extending longitudinally therethrough. The bore in the cutting head is aligned with the bore in the spindle. A vacuum is coupled to the second end portion of the spindle. The vacuum produces air flow through the bores such that material cut by the cutting head flows through the bore in the cutting head and through the bore in the spindle from the first end portion toward the second end portion.

In accordance with yet another aspect of the present invention, there is provided a method for machining a panel. The method includes the steps of: (1) placing a first side of the panel against a plurality of roller transfer balls; (2) clamping the panel between the plurality of roller transfer balls and a plurality of ball bearing members; (3) disposing a machining tool adjacent at least the first or second side of the panel; and (4) moving the machining tool relative to the panel by sliding the panel between the plurality of roller transfer balls and the plurality of ball bearing members.

BRIEF DESCRIPTION OF THE DRAWINGS

The foregoing and other advantages of the invention will become apparent upon reading the following detailed description and upon reference to the drawings in which:

FIG. 5 illustrates a cross-sectional view of the cutting head for the purposes of determining dimensions of the cutting head;

FIG. 6 illustrates the cutting head milling a convex portion of a panel;

FIG. 7 illustrates the cutting head milling a concave portion of a panel;

FIG. 8 illustrates a ballscrew mechanism used in the milling machine in accordance with the present invention;

FIGS. 10A and 10B are schematic diagrams depicting electrical connections for controlling various elements of the milling machine;

FIGS. 12A and 12B are schematic diagrams depicting connections of various gauges and sensors;

Figure 1:
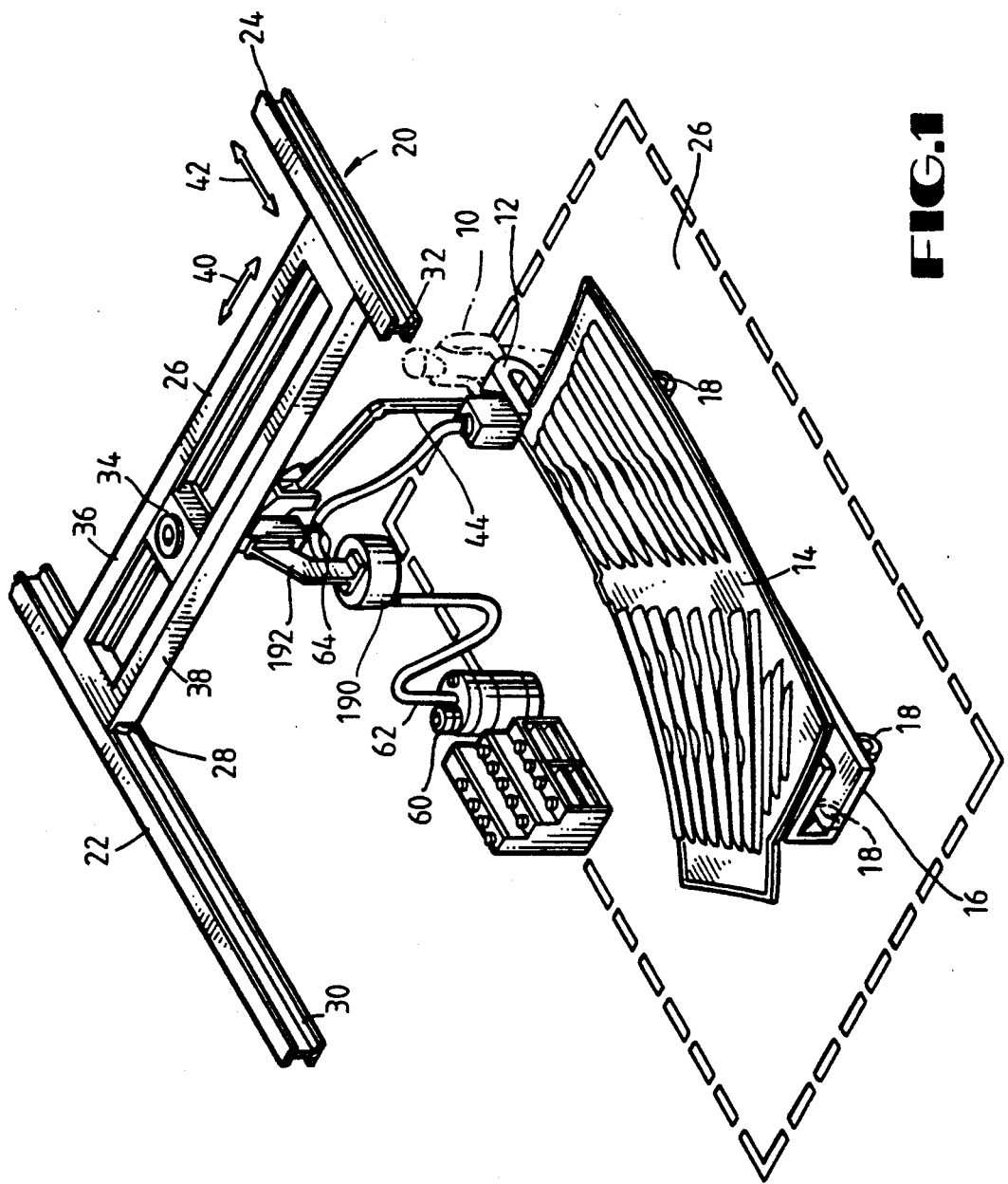
FIG. 1 illustrates a perspective view of an operator using a milling machine in accordance with the present invention to grind a panel.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Turning now to the drawings and referring initially to FIG. 1, an operator 10 is shown to be using a milling machine 12 to grind off portions of a panel 14. The panel 14 is typically made from a composite material, such as graphite or kevlar. As will become apparent in the following discussion, the milling machine 12 is particularly adapted for use with panels having complex contours, such as panels used for the wings of aircraft.

Before the milling procedure begins, the panel 14 is typically placed on a moveable rack 16 or upon another suitable conveyor. To facilitate the milling operation, the panel 14 and the milling machine 12 are each moveable relative to one another. As illustrated, the operator 10 may position the panel 14 by rolling the rack 16 upon its wheels 18. Moreover, since the milling machine 12 is quite moveable, as will be explained herein, the operator 10 may move the milling machine 12 relative to the panel 14.

It should be noticed that the milling machine 12 is preferably coupled to an overhead rail system, designated generally by the reference numeral 20. As illustrated, the overhead rail system 20 preferably includes two parallel rails 22 and 24 that are suspended, in any suitable manner, in a plane parallel to the work floor 25. Another rail member 26 is positioned perpendicular to the rails 22 and 24 and is adapted to slide within and along the rails 22 and 24. As illustrated, the rail member 26 preferably includes rollers 28 on each end thereof, which contact a respective lower lip 30 and 32 of the rails 22 and 24. A mounting member 34 is disposed within opposing rail-like portions 36 and 38 of the rail member 26. The mounting member 34 is moveable along the rail-like portions 36 and 38 in much the same manner that the rail member 26 is moveable between the rails 22 and 24. Therefore, anything connected to the mounting member 34 can be moved in the plane defined by the rail members 22 and 24; the mounting member 34 is moveable in the direction of the double-headed arrow 40, and the rail member 26 is moveable in the direction of the double-headed arrow 42.

Figure 2:
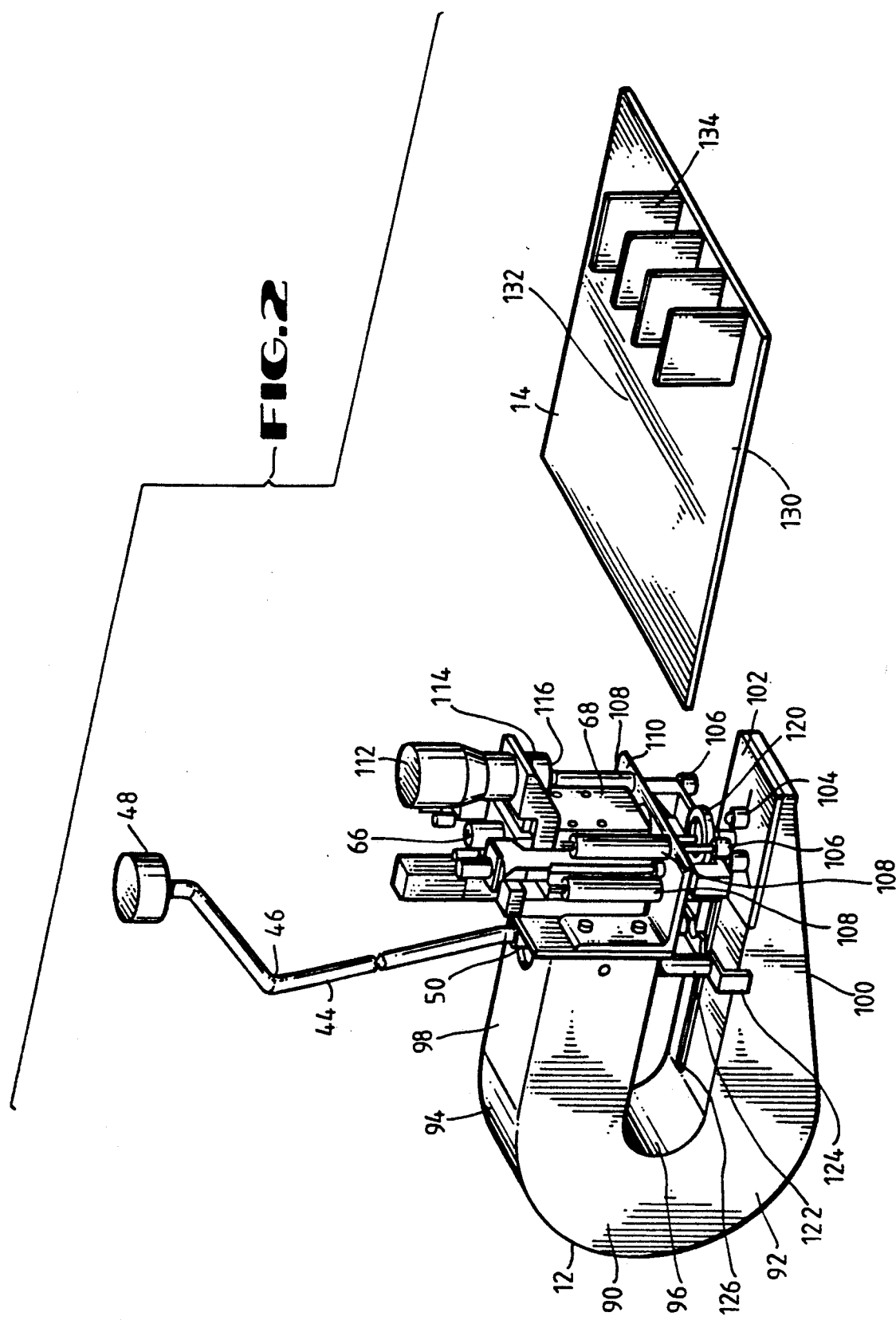
FIG. 2 illustrates a perspective view of the milling machine and of a composite panel to be milled in accordance with the present invention.
Figure 3:
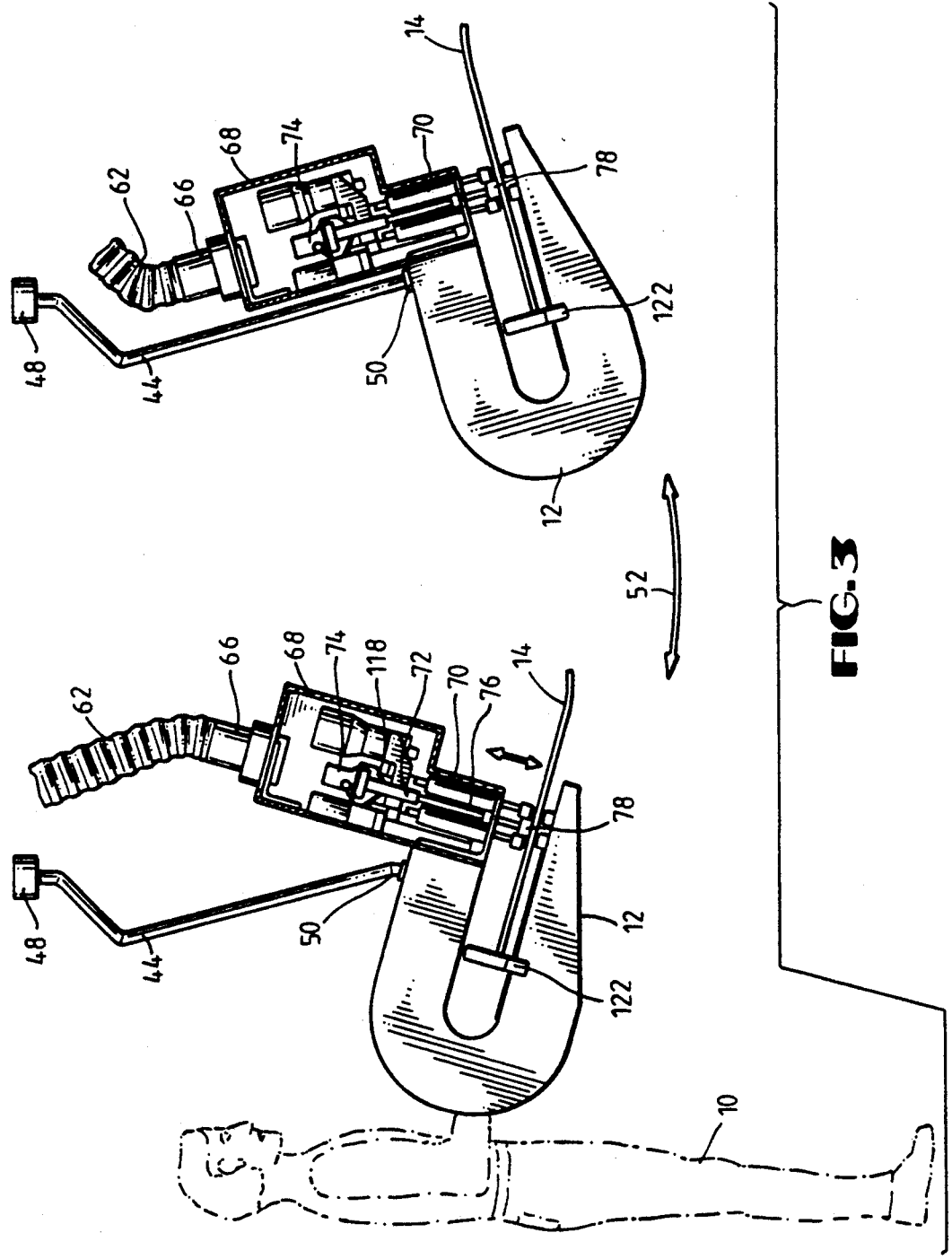
FIG. 3 illustrates a side view of the milling machine and its range of movement.

The milling machine 12 is coupled to the mounting member 34 by an arm 44. The arm 44 may be articulateable having several degrees of freedom. The arm 44 may also be spring-loaded upwardly so that the milling machine 12 acts as a counter-balance. However, the arm 44 is preferably a rigid arm having a bend 46 therein as illustrated in FIGS. 2 and 3. The upper end of the arm 44 is coupled to the mounting member 34 by a universal joint or gimbal mechanism 48. Similarly, the lower end of the arm 44 is coupled to the milling machine 12 by a universal joint or gimbal mechanism So. The mechanisms 48 and So allow the milling machine 12 to follow even very complex contours on the panel 14 as the operator 10 moves the milling machine 12 along the panel 14. The milling machine 12 is illustrated in FIG. 3 as moving back and forth along the curved, double-headed arrow 52.

The milling machine 12 also includes a vacuum system for removing dust produced during the milling operation from the panel 14. As illustrated in FIG. 1, the vacuum system includes a vacuum 60, that may be nothing more than a typical industrial vacuum. The vacuum is connected to the milling machine 12 via a hose 62. The hose 62 is preferably coupled to the overhead rail system 20 and, particularly, to the mounting structure 34, so that it moves with the milling machine 20 and does not interfere with the panel 14. As illustrated, a bracket 64 is coupled to the bottom of the mounting structure 34 so that it encircles the hose 62. Preferably, the hose 62 is corrugated or flexible so that it moves easily with the milling machine 12.

The hose 62 is coupled to a main air venturi 66 that is coupled to the top of a canister portion 68 of the milling machine 12. The main air venturi 66 increases the velocity of air flow out of the canister portion 68 and into the vacuum 60. The canister portion 68 is preferably airtight and encompasses, among other things, a pneumatic motor 70 that drives the grinding tools used by the milling machine 12. The motor 70 includes a spindle 72 that has another air venturi 74 coupled to its upper end. The spindle 72 further includes a central bore 76 extending therethrough. The cutting tool or bit 78, which is attached to the opposite end of the spindle 72, also includes a central bore 84 extending therethrough, as will be explained in detail subsequently. The central bore 84 of the bit 78 is coupled in fluid communication with the bore 76 in the spindle 72 when the bit 78 is attached to the spindle 72. Thus, dust produced as the bit 78 grinds the panel 14 during the milling operation is sucked through the central bore 84 of the bit 78, through the central bore 76 of the spindle 72, through the air venturi 74, through the main air venturi 66, through the hose 62, and, finally, into the vacuum 60.

Figure 4:
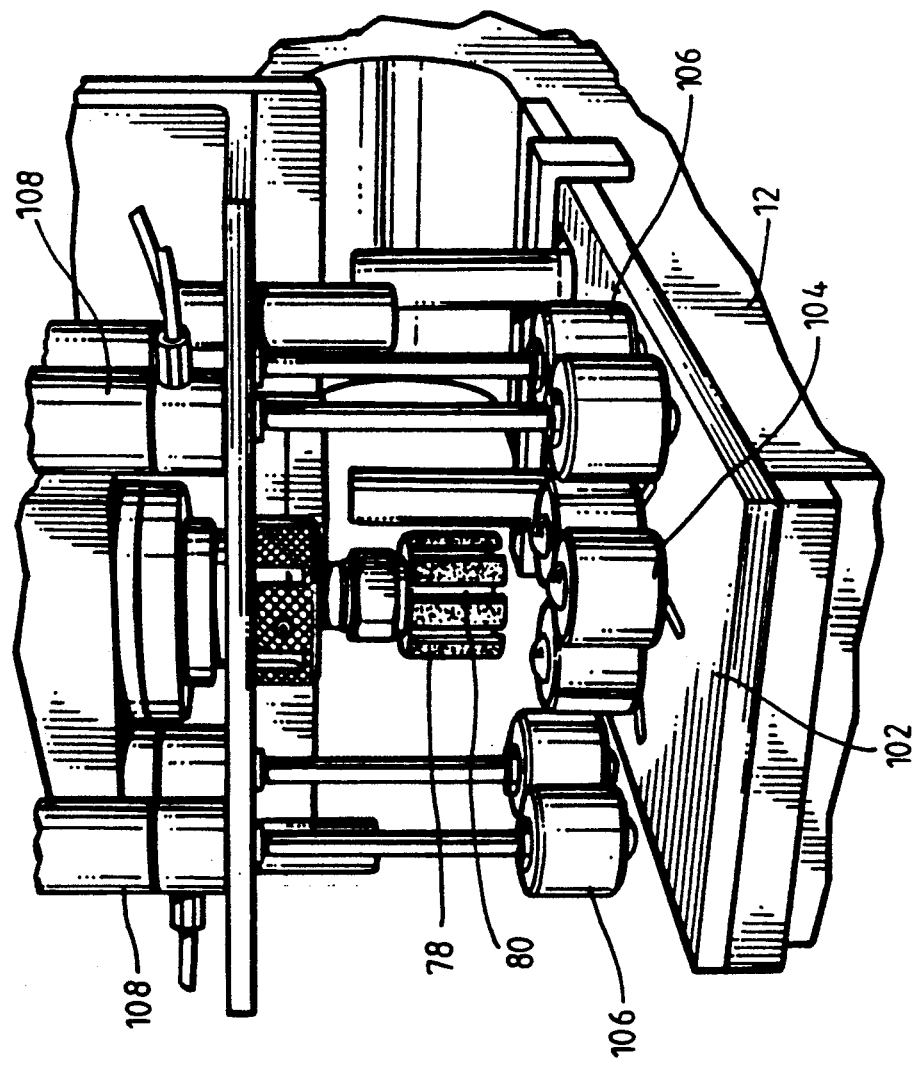
FIG. 4 illustrates a perspective view of the clamping mechanism and cutting head of the milling machine in accordance with the present invention.

The bit 78 is illustrated in greater detail in FIGS. 4-7. As illustrated in FIG. 4, it can be seen that the radially outer surface of the bit 78 includes a plurality of outwardly-facing grooves 80 that extend in the axial direction. The grooves 80 are recessed from the cutting face 82 and lead to the central bore 84 of the bit 78. More particularly, the grooves 80 preferably lead to a conically-shaped portion 86 of the bore 84 that widens as it gets closer to the cutting face 82. The conically-shaped portion 86 of the bore 84 essentially provides a reverse-venturi effect. Air flowing from the conically-shaped portion 86 into the bore 84 slows and becomes slightly denser. Thus, the dust particles in the air are more easily captured by the air flow and drawn toward the vacuum 60.

As previously stated, the milling machine 12 is adapted for milling a panel 14 having complex contours. Thus, the cutting face 82 of the bit 78 should be shaped to facilitate such a milling operation. Clearly, if the radius of curvature R of the panel 14 becomes too great, a perfectly flat cutting face 82 would perform an inadequate milling operation, because it would tend to gouge the surface of the panel 14. Therefore, the cutting face 82 is preferably curved or angled so that the bit 78 can properly mill the contoured panel 14. As illustrated in FIG. 5, the amount that the radially outer edge of the cutting face 82 should differ from the center of the cutting face 82 is given by a dimension C. Table 1, set forth below, provides preferred values of the dimension C for various radii R and for two different bit diameters.

TABLE 1

| DIAMETER | 2" | .75" |
|---|---|---|
| R | C | C |
| 24" | 0.021" | 0.003" |
| 50" | 0.010" | 0.002" |
| 100" | 0.005" | 0.001" |

TABLE 1-continued

| DIAMETER | 2" | .75" |
|---|---|---|
| 150" | 0.003" | 0.001" |
| 200" | 0.002" | 0.001" |

Referring again to FIGS. 2-4, the elements of the milling machine 12 will now be described in greater detail. In order to efficiently mill the panel 14 to the desired tolerances, the milling machine 12 should be stable and stiff so that it can position the rotary bit 78 accurately with respect to the panel 14. To provide this stability and stiffness, the milling machine 12 preferably includes a C-shaped frame. The sides 92 and 94 of the C-shaped frame 90 are preferably formed from a single piece of steel, or other rigid material, such as a braided graphite or kevlar composite. The radially inner panels 96 and the radially outer panels 98 of the C-shaped frame 90 couple the sides 92 and 94 together. The panels 96 and 98 also provide torsional stability to prevent the sides 92 and 94 from moving relative to one another and to minimize any lateral movement between the ends of the C-shaped frame 90. Although not illustrated in these drawings, handles are preferably coupled to the C-shaped frame 90 to allow the operator 10 to move the milling machine 12 relative to the panel 14.

The lower end 100 of the C-shaped frame 90 carries a platform 102 which has a plurality of roller transfer balls 104 coupled thereto. Preferably, the platform 102 carries three transfer balls 104. The transfer balls 104 are arranged in a triangular configuration, so that the transfer balls 104 define a reference plane and provide a three-point contact for the lower side of the panel 14.

The upper end of the C-shaped frame 90 includes essentially two mechanisms. The first mechanism includes four ball bearing members 106 that are coupled to respective pneumatic cylinders 108, thus forming a clamping mechanism. The clamping mechanism maintains the panel 14 in contact with the roller transfer balls 104. After the panel 14 is placed between the roller transfer balls 104 and the bit 78, the clamping mechanism is actuated so that the pneumatic cylinders 108 lower the ball bearing members 106 into contact with the upper surface of the panel 14. Thus, the roller transfer balls 104 establish a plane perpendicular to the rotational axis of the bit 78, and the clamping mechanism forces the panel 14 onto the roller transfer balls 104 so that the panel 14 remains perpendicular to the bit 78 throughout the milling procedure. The roller transfer balls 104 and the ball bearing members 106 rotate as the milling machine 12 is moved along the panel 14.

As mentioned previously in regard to FIG. 3, an pneumatic motor 70 having an spindle 72 drives the rotary bit 78. However, the upper end 110 of the C-shaped frame 90 also includes a second mechanism that moves the spindle 72 axially to adjust the axial position of the bit 78 relative to the panel 14. This height-adjustment mechanism includes a electric stepper motor 112 that drives the spindle 72 up or down to position the rotating bit 78. The stepper motor 112 is coupled to a ballscrew mechanism 118, which is illustrated in FIG. 8 and available from Micro Slides, Inc. of 65 Jefryn Blvd. East, Deer Park, N.Y. 11729. The ballscrew mechanism 118 includes a sprocket or direct stepper motor mounting 119 for coupling to the stepper motor 112. For direct mounting, the armature of the stepper motor 112 may be coupled directly to the mounting 119. Otherwise, the stepper motor 112 may carry a sprocket 114 that is coupled to the sprocket 119 via a drive belt 116. Regardless, the sprocket or mounting 119 is coupled to a leadscrew 121 such that rotation of the sprocket or mounting 119 produces corresponding rotation of the leadscrew 121. The leadscrew 121 is screwthreadably coupled to a slide assembly 123 so that rotation of the leadscrew 121 produces linear movement of the slide assembly 123. The spindle 72 is mounted onto the slide assembly 123. Thus, rotation of the stepper motor 112 causes rotation of the leadscrew 121 and linear movement of the slide assembly 123 and spindle 72. In this fashion, the rotating bit 78 may be positioned axially relative to the surface of the panel 14.

The stepper motor 112 may be operated in the forward and reverse directions where each step or incremental rotation corresponds to axial movement of the spindle 72. Thus, as the motor 112 rotates in a first direction, the spindle 72 moves upwardly and raises the bit 78, and when the motor 112 rotates in the opposite direction, the spindle 72 moves downwardly and lowers the bit 78. When the bit 78 is in its upper position, it recedes into containment ring 120 that surrounds the bit 78. The containment ring 120 protects the panel 14 from damage in some situations. For instance, if the panel 14, for some reason, should tilt upwardly toward the bit 78, the panel 14 would contact the containment ring 120 instead of the bit 78.

The C-shaped frame 90 also carries location rollers 122 that are disposed between the lower end 100 and the upper end 110 of the C-shaped frame 90. The location rollers 122 are preferably linear roller bearings that rotate about an axis parallel to the spindle's rotational axis. The location rollers 122 are mounted on a sliding mechanism 124 that is adapted to slide back and forth within a slot 126 in the lower end 100 of the C-shaped frame 90. Preferably, the sliding mechanism 124 includes a dovetailed portion (not shown) that corresponds to and slides within a dovetailed slot in the lower end 100 of the C-shaped frame 90.

The location rollers 122 follow the edge of the panel 14 when it is inserted between the lower end 100 and the upper end 110 of the C-shaped frame 90 during the milling operation. The operator 10 may position the location rollers 122 anywhere along the slot 126 to facilitate the milling operation. For instance, if the operator 10 decided to begin at the edge of the panel 14 and work inwardly, the operator 10 would first position the location rollers 122 near the platform 102 for the first pass. For each successive pass, the operator 10 would position the location rollers 122 successively further away from the platform 102.

It should also be understood that, typically, the outer mold line (OML) surface 130 of the panel 14 is the master surface that the inner mold line (IML) surface 132 should conform to. The OML surface 130 of a composite panel 14 is smoother and more accurately defined than the IML surface 132 of the panel 14. If the panel 14 is to be used for an aircraft wing, for instance, the OML surface 130 is very smooth for aerodynamic and radar cross-section purposes. Thus, the OML surface 130 preferably faces downwardly so that it will rest on the roller transfer balls 104 during the milling operation and thereby define the plane normal to the bit 78 during the milling operation. In this orientation, the IML surface 132 is machined until the panel 14 exhibits a substantially consistent thickness. As illustrated in FIG. 2, a plurality of flanges 134 may be formed on the IML surface 132. These flanges 134 may be used to attach the panel 14 to a sub-structure, such as the sub-structure of an aircraft wing, for instance.

Preferably, the milling machine 12 and its associated mechanisms described above are electrically controlled. FIGS. 9-14 are schematic diagrams that illustrate the electrical controls for the milling machine 12. It is desirable to locate most of the electrical controls for the milling machine 12 in a convenient location separate from the milling machine 12. In the preferred embodiment, the electrical controls are disposed in various electrical enclosures that are coupled to the mounting member 34. So mounted, the electrical controls may move along with the milling machine 12 as it moves, yet they do not make the milling machine 12 overly cumbersome for the operator 10. For instance, the main electrical enclosure 190 is coupled to the mounting member 34 via a bracket 192.

It should be noted that the enclosures are wired together using a plurality of terminal blocks. In other words, the electrical connections in each enclosure terminate at one or more terminal blocks, and wires run between appropriate terminal blocks on the various enclosures to permit proper electrical communication. Because one skilled in the art understands these types of electrical connections, the electrical connections illustrated in the drawings will not be described in detail herein. The numbering of the wires and/or the numbering on the terminal blocks generally indicates the connections between the various enclosures.

Figure 9A:
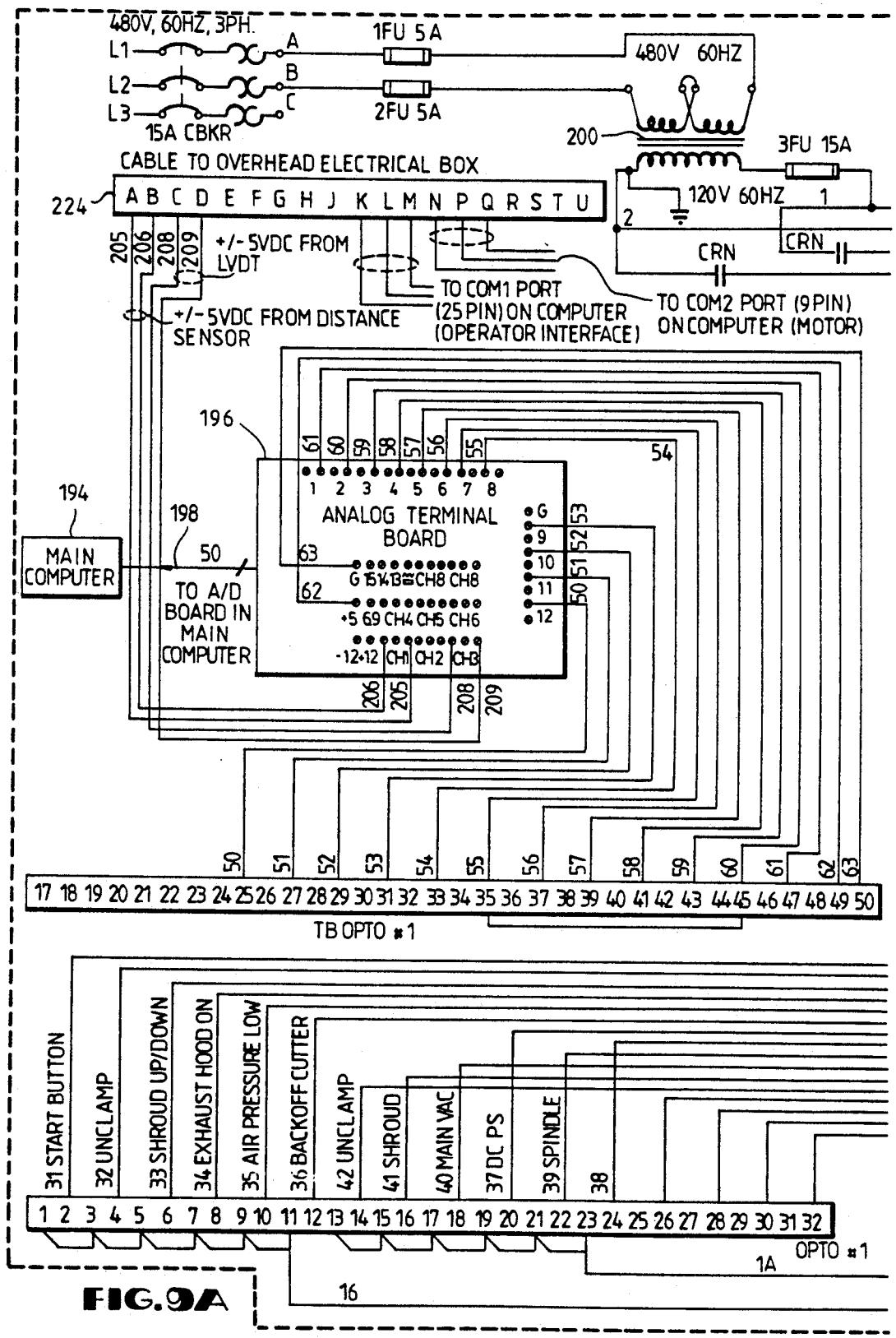
FIGS. 9A and 9B are schematic diagrams of the main electrical system for the milling machine.
Figure 9B:
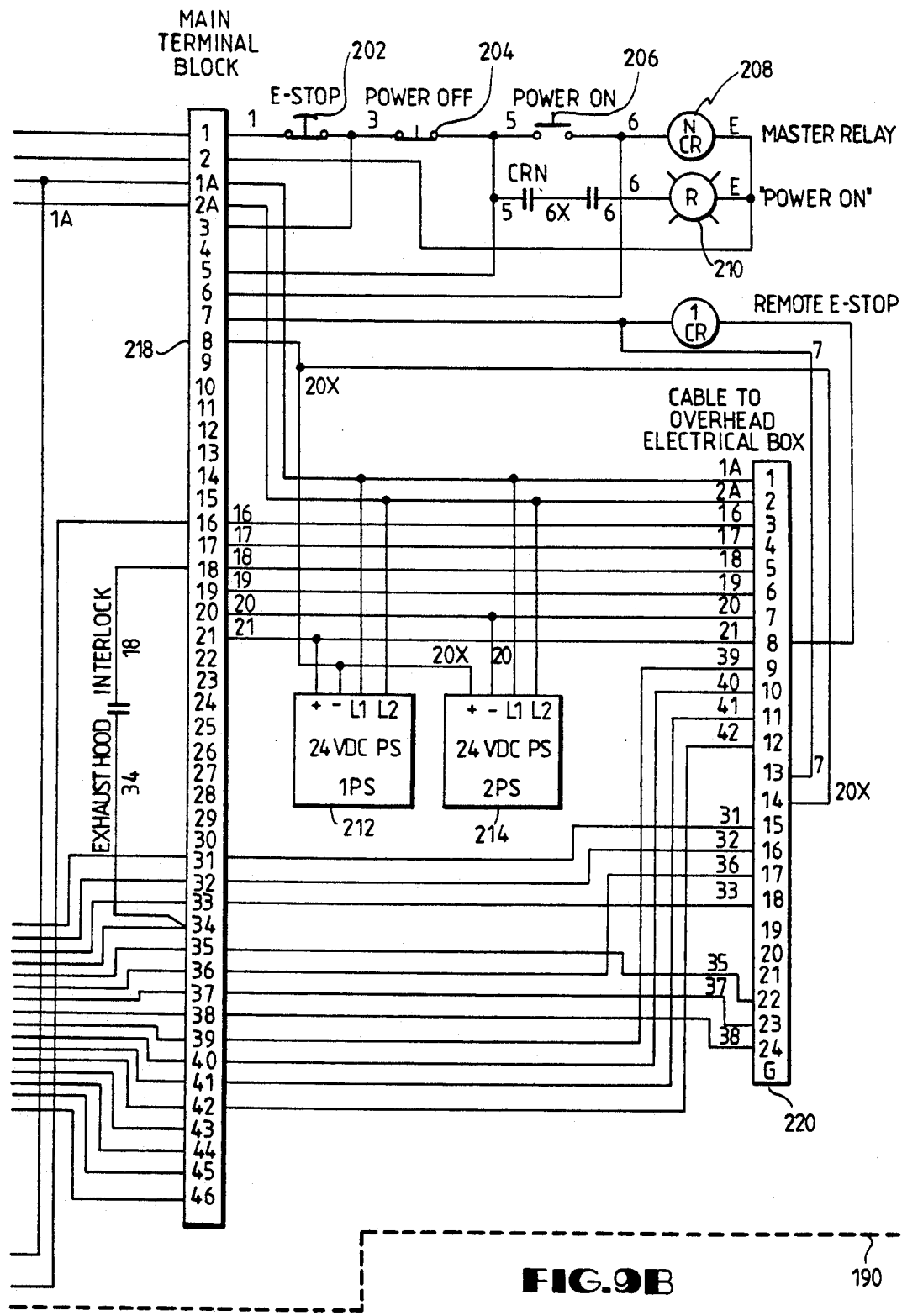
Figure 10A:
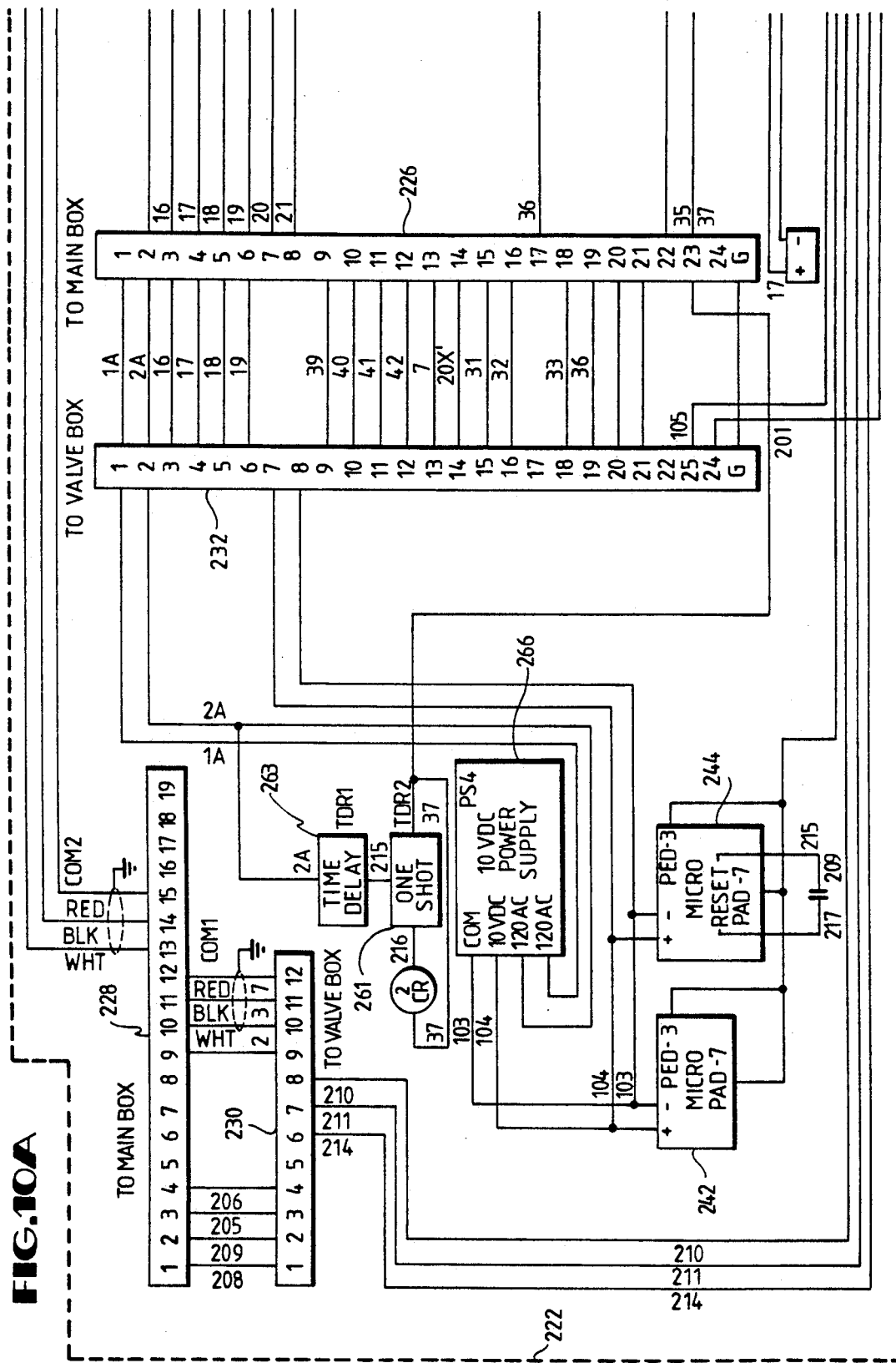

The main electrical enclosure 190, illustrated in FIG. 9, contains three different terminal blocks. The main terminal block 218 basically acts as the main wire distribution center. The terminal blocks 220 and 224 are coupled to wires that carry signals to or from the overhead electrical enclosure 222, illustrated in FIG. 10. The terminal block 220 generally corresponds to the terminal block 226, and the terminal block 224 generally corresponds to the terminal block 228. The overhead electrical enclosure 222 also includes two terminal blocks 230 and 232 that couple to wires carrying signals to be delivered to circuitry within the overhead valve enclosure 234, illustrated in FIG. 11. The terminal block 230 generally corresponds to the terminal block 236, and the terminal block 232 generally corresponds to the terminal block 238.

Referring to FIG. 9, which illustrates the contents of the main electrical enclosure 190, the power for the electrical controls is preferably received on lines L1, L2, and L3 as three-phase voltage having an amplitude of 480 volts and a frequency of 60 hertz. The lines L1 and L2 are coupled to a transformer 200, which outputs a single phase voltage signal having an amplitude of 120 volts and a frequency of 60 hertz. An emergency-stop switch 202, a power-off switch 204, and a power-on switch 206 control the delivery of this voltage signal to other elements of the electrical control that use this voltage level. For instance, when each of the switches 202, 204, and 206 is closed, power is delivered to the master relay 208 and to a light 210. The light 210 becomes illuminated when electrical power is supplied to the milling machine 12, thus indicating the operational state of the milling machine 12 to the operator.

The main electrical enclosure 190 also contains a main computer 194. The main computer 194 is preferably available from Ampro of 1130 Mountain View/Alviso Road, Sunnyvale, Calif. 94089 as Model 7B. The primary program storage is provided by a 512K Dallas semiconductor, battery-backed, RAM disc. This disc is preferably loaded using a 360K floppy disc drive (not shown). COM 1 couples the operator interface 280 (FIG. 11) to the main computer 194. The operation of the milling machine 12 is menu driven through this operator interface 280. COM 2 interfaces the stepper motor controller 216 to the computer 194.

The main computer 194 communicates with the various electrical elements described herein through an analog-to-digital converter board (not shown), which is preferably a 16 bit convertor. The analog-to-digital converter board converts analog signals from external sources to digital signals that can be processed by the computer 194. The enclosure 190 also contains an analog terminal board 196 to which wires carrying analog signals from these various external sources are attached. The signals from the board 196 are transferred to the analog-to-digital converter board on the computer 194 via a data bus 198.

The analog-to-digital converter card interfaces the main computer 194 with the linear variable displacement transducer (LVDT) 282. The LVDT 282 measures the curvature of the panel 14 and transmits this information to the main computer 194. This curvature information is used to offset the cutting thickness to prevent thinning the panel 14 in areas of high curvature. The main computer 194 processes this information and controls the position of the stepper motor 112 and, thus, the position of the bit 78. For instance, as the curvature of the panel 14 increases, the stepper motor 112 controllably retracts the bit 78.

The analog-to-digital converter also interfaces the main computer 194 with a laser measurement device 284. The laser measurement device 284 includes a distance sensor 286 and a laser head 288. This device 284 protects the panel 14 from a failure of the stepper motor controller 216 or from a failure of communications with the stepper motor controller 216. The laser head 288 projects a laser beam onto bit 78, and the distance sensor 286 receives the reflected beam and determines the position of the bit 78. If the position of the bit 78, as measured by the distance sensor 286 does not coincide with the position, as set by the stepper motor controller 216, the main computer 194 delivers a signal to the solenoid 290 that controls the motor 70 to shut off the motor 70.

The main computer 194 also controls other solenoids that deliver power to various devices associated with the milling machine 12. These solenoids are illustrated schematically in FIG. 11. For instance, the computer 194 controls the vacuum 60 via the solenoid 292.

Figure 12B:
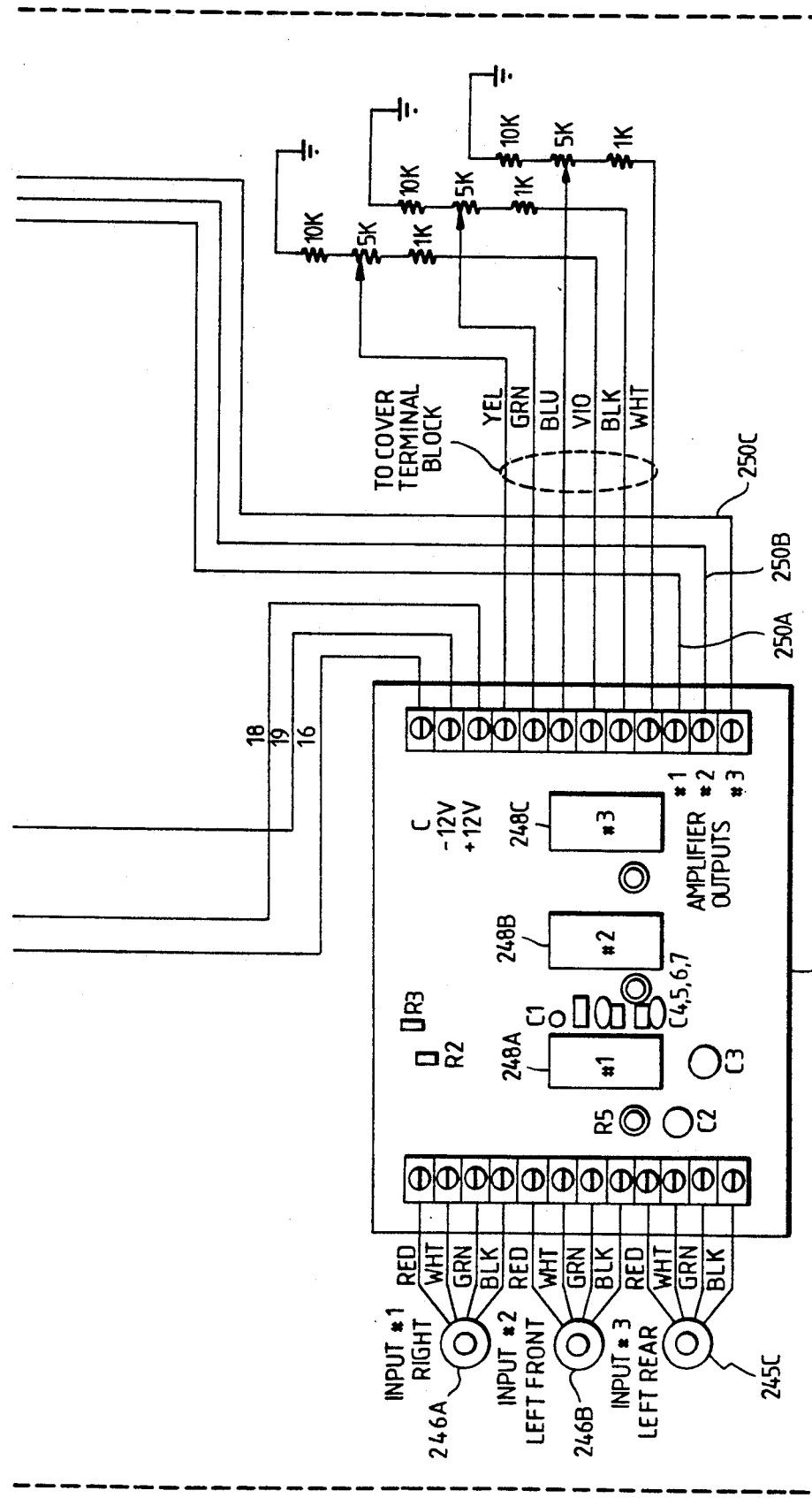
Figure 13:
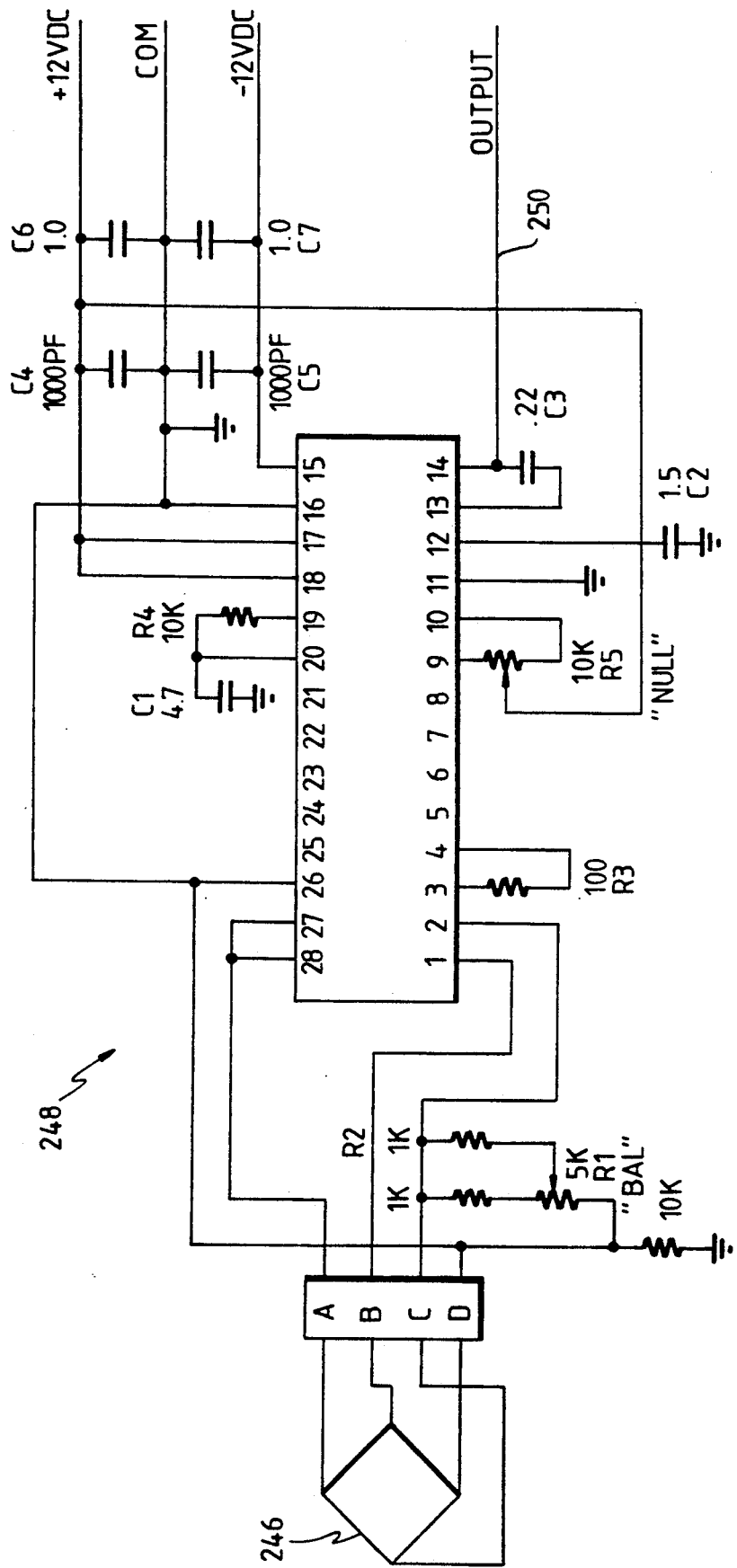
FIG. 13 is a schematic diagram of a strain gauge amplifier circuit.

The main electrical enclosure 190 further contains two 24 volt DC power supplies 212 and 214, which are connected in series to yield a 48 volt DC signal. These power supplies 212 and 214 provide power to the stepper motor controller 216, which resides in the overhead electrical enclosure 222 illustrated in FIG. 10. Power is also supplied to the stepper motor controller 216 by a power supply 268. The stepper motor controller 216 is coupled to the stepper motor 112, as illustrated in FIG. 12, via a line 240. As set forth above, the stepper motor controller 216 controls the position of the stepper motor 112 and, thus, the position of the rotary bit 78.

The overhead electrical enclosure 222 also includes two microcomputers 242 and 244. Power is supplied to the microcomputers 242 and 244 by a power supply 266. These microcomputer systems 242 and 244 use a small single-board computer with built-in operating systems, electrically erasable programmable read only memory (EEPROM), and RS232 interfaces. These microcomputer systems 242 and 244 may be of the type available from New Micros Inc. of 1601 Chalk Hill Road, Dallas, Tex. 75212 as Model No. NMII-0232.

The microcomputer 242 monitors the pressure of the air being delivered to the clamping cylinders 108. This incoming air pressure is sensed by the pressure transducer 260, illustrated in FIG. 11. Preferably, the pressure transducer 260 delivers a voltage signal ranging in amplitude from 0 to 10 volts DC in response to sensed pressure ranging in amplitude from 0 to 100 psi. The amplitude of the voltage signal is preferably reduced to a range between 0 and 5 volts DC by a voltage divider 262, illustrated in FIG. 10. This monitored pressure, represented by the amplitude of the voltage signal, is compared to a programmed set point by the microcomputer 242. If the incoming air pressure falls below this programmed set point, the microcomputer 242 delivers a signal to the main computer 194. In response to this signal, the main computer 194 signals the stepper motor controller 216 to turn the stepper motor 112 so that it retracts the bit 78 within the containment ring 120. The main computer 194 then delivers a signal to the operator, indicating that the air pressure is too low to operate the milling machine 12.

The microcomputer system 244 monitors the roller transfer balls 104 that keep the cutting face 82 of the bit 78 perpendicular to the OML surface 130. If any one of the roller transfer balls 104 loses contact with the OML surface 130, the bit 78 could machine the IML surface 132 of the panel 14 more than desired. To guard against this occurrence, each roller transfer ball 104 is instrumented with a strain gauge, such as the strain gauge 246 illustrated in FIG. 13. Each strain gauge 246 emits a signal having an amplitude of a few millivolts. The amplifier circuit 248, illustrated in FIG. 13, amplifies this low amplitude signal from the strain gauge 246 to a few volts. The amplifier circuit 248 outputs this amplified voltage signal from the strain gauge 246 on the line 250, which is coupled to an analog input of the microcomputer 244. The microcomputer 244 is preferably programmed to maintain an average of the last eight readings from each roller transfer ball's strain gauge reading. If the force on any of the roller transfer balls 104 falls below a preselected value, the microcomputer 244 emits a signal that causes the stepper motor controller 216 to jump to a subroutine that turns the stepper motor 112 to full speed so that it rotates to its home position, thus retracting the bit 78 within the containment ring 120.

If three roller transfer balls 104 are used, as previously mentioned, three strain gauges and amplifier circuits are used. These circuits are preferably mounted on a board 252, as illustrated in FIG. 12. The strain gauges 246a, 246b, and 246c are coupled to the respective amplifier circuits 248a, 248b, and 248c. The signals from the amplifier circuits 248a, 248b, and 248c are delivered on output lines 250a, 250b, and 250c, respectively. The lines 250a, 250b, and 250c are also coupled to respective gauges 254a, 254b, and 254c, which provide the operator 10 with a visual indication of the force being asserted on each of the roller transfer balls 104. Power is provided to the amplifier circuits 248a, 248b, and 248c, via the lines 256.

It should also be noted that the microcomputers 242 and 244 are coupled to a one shot latch 261 and to a time delay circuit 263. These circuits hold the output signals from the microcomputers 242 and 244 steady for a predetermined period of time to insure that the main computer 194 responds properly by causing the stepper motor 112 to retract the bit 78.

Figure 11:
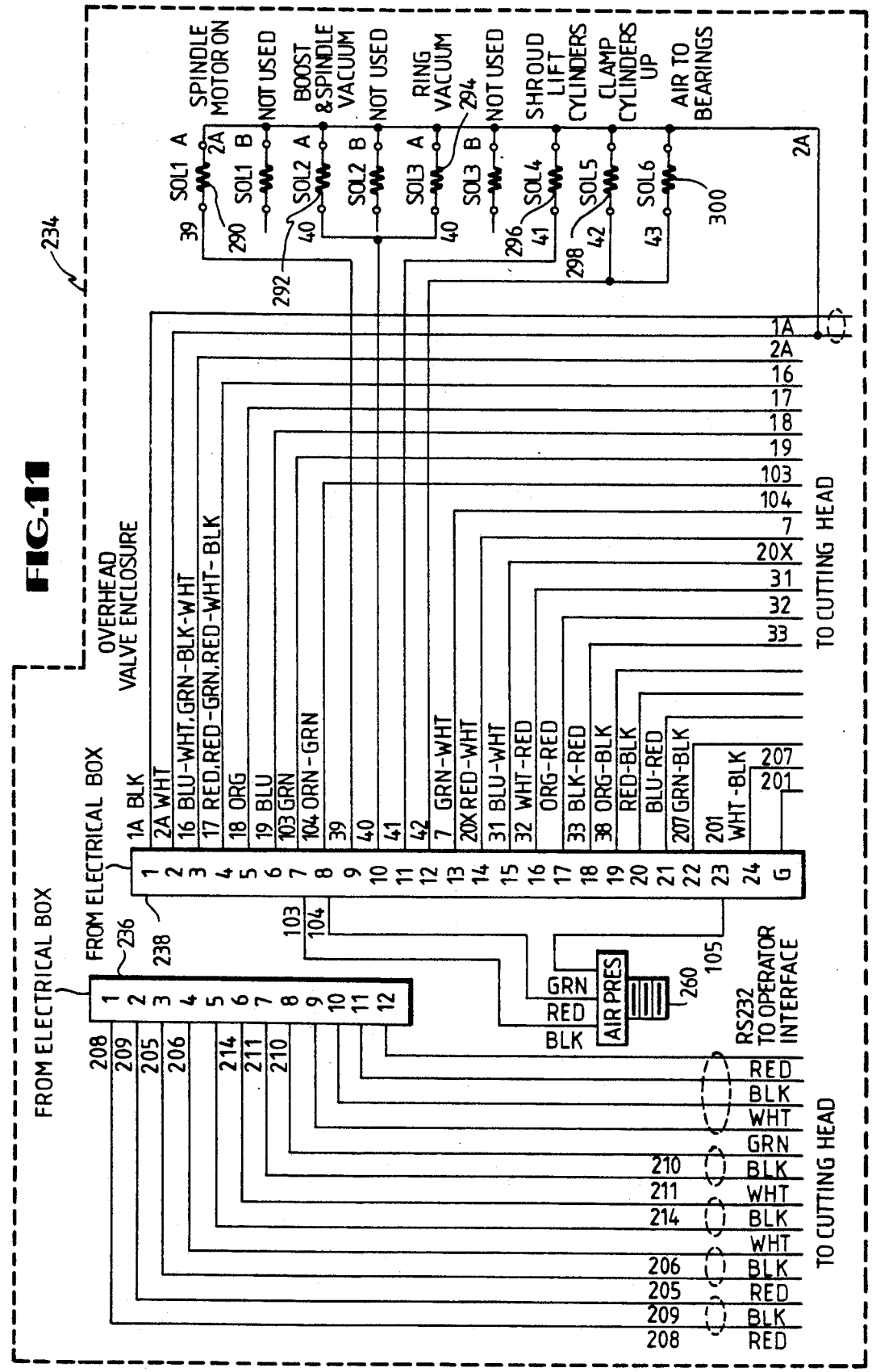
FIG. 11 is a schematic diagram depicting connections of a motor controller.

The air pressure in the clamp cylinders 108 is monitored by another microcomputer 270, which resides in the overhead valve enclosure 234 illustrated in FIGS. 11 and 12. The air pressure is sensed by a pressure transducer 272, or multiple pressure transducers, which is coupled to the cylinders 108. Preferably, the pressure transducer 272 outputs a voltage signal between 0 and 10 volts DC in response to pressures ranging from 0 to 100 psi. This voltage is preferably reduced to 0 to 5 volts DC, by a voltage divider 274, before it is applied to an analog input of the microcomputer 270.

When the milling machine 12 is being used to grind a portion of the surface 132 near the edge of the panel 14, it is possible that one of the clamp cylinders 108 will fall off the edge of the panel 14. When this happens, the bit 78 can dig into the surface 132 of the panel 14 and, thus, damage the panel 14. To solve this problem, the microcomputer 270 and the pressure transducer 272 monitor the air pressure that forces the clamp cylinders 108 downwardly against the surface 132 of the panel 14. A rapid drop in this monitored pressure indicates that one of the ball bearing members 106 is falling off the edge of the panel 14. The microcomputer 270 is preferably programmed to maintain an average of the last five pressure readings and to compare this average to each new pressure reading. If the new reading drops by more than about 2 psi for two out of three consecutive readings, the microcomputer 270 assumes that one of the ball bearing members 106 is falling off the edge of the panel 14. Thus, the microcomputer 270 delivers a signal to the main computer 194. In response to this signal, the main computer 194 signals the stepper motor controller 216 to turn the stepper motor 112 at full speed to retract the bit 78 upwardly within the containment ring 120.

Figure 14:
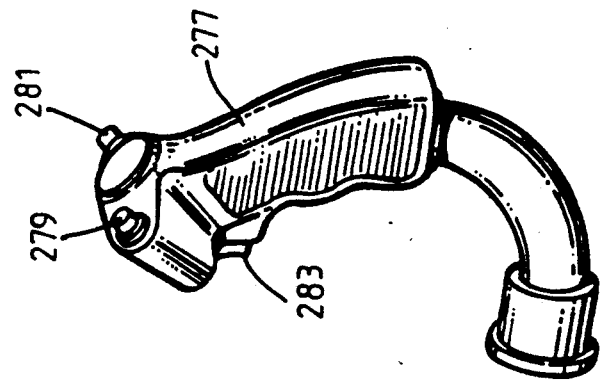
FIG. 14 illustrates a handle for the milling machine.

The operator can also control some of the above-mentioned functions. Preferably, at least one of the handles mentioned earlier includes control switches or buttons, as illustrated in FIG. 14. The handle 277 includes a button 279 for raising and lowering the clamping mechanism, a button 281 for raising a shroud during machining, and a trigger 283 for starting the milling machine 12.

In view of the above description, it can be seen that the milling machine 12 offers significant advantages over prior milling machines, particularly in the field of milling composite panels. The structure of the milling machine 12 (the C-shaped frame, the clamping mechanism, and the roller transfer balls) provides an accurate and stable reference during the milling operation. The vacuum system substantially eliminates the dust produced during the milling operation, so that the machine is cleaner and grinds more accurately. The electrical system, with the retractable bit control and the emergency stopping modes, facilitates even more accurate grinding without undesirable results.

We claim:

1. A milling machine comprising:
 a C-shaped frame having an upper arm portion and a lower arm portion;
 a plurality of first roller members coupled to said lower arm portion of said C-shaped frame, said plurality of first roller members extending upwardly from said lower arm portion toward said upper arm portion, said plurality of first roller members being arranged in a planar configuration;
 a cutting head being rotatably coupled to said upper arm portion of said C-shaped frame, said cutting head extending downwardly from said upper arm portion toward said lower arm portion and being rotatable about an axis; and
 a plurality of second roller members coupled to said upper arm portion of said C-shaped frame, said plurality of second roller members extending downwardly from said upper arm portion toward said lower arm portion and being slidably moveable generally toward and away from said plurality of first roller members.

2. The milling machine, as set forth in claim 1, further comprising:
 an arm having a first end portion and a second end portion, said first end portion being coupled to said upper arm portion of said C-shaped frame and said second end portion being coupled to a support member being positioned above said C-shaped frame.

3. The milling machine, as set forth in claim 2, further comprising:
 a first gimbal mechanism coupling said first end portion of said arm to said upper arm portion of said C-shaped frame; and
 a second gimbal mechanism coupling said second end portion of said arm to said support member.

4. The milling machine, as set forth in claim 2, wherein said support member comprises:
 a first rail and a second rail being mounted above said C-shaped frame, said first rail being substantially parallel to said second rail;
 a rail member having a first end portion and a second end portion, said first end portion of said rail member being coupled to said first rail and said second end portion of said rail member being coupled to said second rail, said rail member being slidably moveable along said first and second rails; and
 a mounting structure being coupled to said rail member and being slidable moveable along said rail member, said mounting structure being coupled to said second end portion of said arm.

5. The milling machine, as set forth in claim 1, wherein each of said plurality of first roller members comprises:
 a ball bearing; and
 a socket member within which said ball bearing rotates, said socket member being coupled to said lower arm portion of said C-shaped frame such that a portion of said ball bearing is exposed and extends upwardly from said socket member toward said upper arm portion.

6. The milling machine, as set forth in claim 1, further comprising:
 a transducer being coupled to at least one of said plurality of first roller members, said transducer being adapted for delivering a signal, said signal having an attribute being correlative to a force being exerted on said at least one of said plurality of first roller members.

7. The milling machine, as set forth in claim 6, wherein said transducer is a strain gauge.

8. The milling machine, as set forth in claim 1, wherein said plurality of first roller members comprise:
 three first roller members being coupled to said lower arm portion of said C-shaped frame opposing said plurality of second roller members and being arranged in a triangular configuration.

9. The milling machine, as set forth in claim 1, further comprising:
a motor having a spindle, said spindle having a first end portion and a second end portion and having a bore extending longitudinally therethrough.

10. The milling machine, as set forth in claim 9, wherein said cutting head is coupled to said first end portion of said spindle and has a longitudinal bore extending therethrough, said bore of said cutting head being aligned with said bore of said spindle.

11. The milling machine, as set forth in claim 1, further comprising:
a mechanism being coupled to said cutting head and being adapted for moving said cutting head upwardly and downwardly along said axis relative to said lower arm portion of said C-shaped frame.

12. The milling machine, as set forth in claim 11, wherein said mechanism comprises:
a motor having an spindle, said spindle having a first end portion and a second end portion and an axis, said first end portion being coupled to said cutting head, said spindle being rotatable about said axis and being slidably moveable along said axis;
a ballscrew mechanism having a lead screw and a slide assembly, said lead screw being screwthreadably coupled to said slide assembly so that rotation of said lead screw causes linear movement of said slide assembly, said spindle being coupled to said slide assembly; and
a stepper motor being rotatably coupled to said lead screw so that rotation of said stepper motor controllably slides said spindle along said axis.

13. The milling machine, as set forth in claim 12, further comprising:
a stepper motor controller being coupled to said stepper motor and being adapted for controllably rotating said stepper motor.

14. The milling machine, as set forth in claim 1, wherein each of said plurality of second roller members comprises:
a ball bearing;
a socket member within which said ball bearing rotates such that a portion of said ball bearing is exposed and extends downwardly from said socket member toward said lower arm portion; and
a mechanism being coupled to said socket member and being adapted for moving said socket member and said ball bearing upwardly and downwardly generally parallel to said axis.

15. The milling machine, as set forth in claim 14, wherein said mechanism comprises:
a pneumatic or hydraulic cylinder having a piston longitudinally disposed therein, said piston being retractable and extendable and being coupled to said socket member.

16. The milling machine, as set forth in claim 1, further comprising:
a transducer being coupled to at least one of said plurality of second roller members, said transducer being adapted for delivering a signal, said signal having an attribute being correlative to a force being exerted by said at least one of said plurality of second roller members.

17. The milling machine, as set forth in claim 16, wherein said transducer is a pressure sensor.

18. The milling machine, as set forth in claim 1, wherein said plurality of second roller members comprise:
four second roller members being coupled to said upper arm portion of said C-shaped frame opposing said plurality of first roller members and being arranged in a rectangular configuration surrounding said cutting head.

19. The milling machine, as set forth in claim 1, further comprising:
a first transducer being coupled to at least one of said plurality of first roller members, said first transducer being adapted for delivering a first signal, said first signal having an attribute being correlative to a force being exerted on said at least one of said plurality of first roller members;
a second transducer being coupled to at least one of said plurality of second roller members, said second transducer being adapted for delivering a second signal, said second signal having an attribute being correlative to a force being exerted by said at least one of said plurality of second roller members;
a control system being coupled to said first and second transducers to receive said first and second signals, said control system processing said attribute of at least one of said first and second signals and delivering a signal to cease operation of said milling machine in response to said attribute being correlative to a force outside of a preselected range.

20. The milling machine, as set forth in claim 19, wherein said first transducer is a strain gauge, and wherein said control system retracts said cutting head if said attribute of said first signal is correlative to a force that is less than a preselected force.

21. The milling machine, as set forth in claim 19, wherein said second transducer is a pressure sensor, and wherein said control system retracts said cutting head if said attribute of said second signal is correlative to a force that is less than a preselected force.

22. A milling machine, comprising:
a C-shaped frame having an upper arm portion and a lower arm portion;
a plurality of first ball bearing assemblies, each of said first ball bearing assemblies having a first ball bearing and a first socket member within which said first ball bearing rotates, each of said first socket members being coupled to said lower arm portion of said C-shaped frame such that a portion of each first ball bearing is exposed and extends upwardly from said respective first socket member toward said upper arm portion, said plurality of first ball bearing assemblies being arranged in a planar configuration on said lower arm portion;
a cutting head being rotatably coupled to said upper arm portion of said C-shaped frame, said cutting head extending downwardly from said upper arm portion toward said lower arm portion and being rotatable about an axis; and
a plurality of second ball bearing assemblies coupled to said upper arm portion of said C-shaped frame, each of said second ball bearing assemblies having a second ball bearing, a second socket member within which said respective second ball bearing rotates such that a portion of said second ball bearing is exposed and extends downwardly from said second socket member toward said lower arm portion, and a mechanism being coupled to said second socket member for moving said second socket member and said second ball bearing upwardly and downwardly away from and toward said plurality of first ball bearing assemblies.

23. The milling machine, as set forth in claim 22, further comprising:
an arm having a first end portion and a second end portion, said first end portion being coupled to said upper arm portion of said C-shaped frame and said second end portion being coupled to a support member being positioned above said C-shaped frame.

24. The milling machine, as set forth in claim 23, further comprising:
a first gimbal mechanism coupling said first end portion of said arm to said upper arm portion of said C-shaped frame; and
a second gimbal mechanism coupling said second end portion of said arm to said support member.

25. The milling machine, as set forth in claim 23, wherein said support member comprises:
a first rail and a second rail being mounted above said C-shaped frame, said first rail being substantially parallel to said second rail;
a rail member having a first end portion and a second end portion, said first end portion of said rail member being coupled to said first rail and said second end portion of said rail member being coupled to said second rail, said rail member being slidably moveable along said first and second rails; and
a mounting structure being coupled to said rail member and being slidable moveable along said rail member, said mounting structure being coupled to said second end portion of said arm.

26. The milling machine, as set forth in claim 22, further comprising:
a transducer being coupled to at least one of said plurality of first ball bearing assemblies, said transducer being adapted for delivering a signal, said signal having an attribute being correlative to a force being exerted on said at least one of said plurality of first ball bearing assemblies.

27. The milling machine, as set forth in claim 26, wherein said transducer is a strain gauge.

28. The milling machine, as set forth in claim 22, wherein said plurality of first ball bearing assemblies comprise:
three first ball bearing assemblies being coupled to said lower arm portion of said C-shaped frame opposing said plurality of second ball bearing assemblies and being arranged in a triangular configuration.

29. The milling machine, as set forth in claim 22, further comprising:
a motor having a spindle, said spindle having a first end portion and a second end portion and having a bore extending longitudinally therethrough, said cutting head being coupled to said first end portion of said spindle and having a longitudinal bore extending therethrough, said bore of said cutting head being aligned with said bore of said spindle.

30. The milling machine, as set forth in claim 22, further comprising:
an apparatus being coupled to said cutting head and being adapted for moving said cutting head upwardly and downwardly along said axis relative to said lower arm portion of said C-shaped frame.

31. The milling machine, as set forth in claim 30, wherein said apparatus comprises:
a motor having an spindle, said spindle having a first end portion and a second end portion and an axis, said first end portion being coupled to said cutting head, said spindle being rotatable about said axis and being slidably moveable along said axis;
a ballscrew mechanism having a lead screw and a slide assembly, said lead screw being screwthreadably coupled to said slide assembly so that rotation of said lead screw causes linear movement of said slide assembly, said spindle being coupled to said slide assembly; and
a stepper motor being rotatably coupled to said lead screw so that rotation of said stepper motor controllably slides said spindle along said axis.

32. The milling machine, as set forth in claim 31, further comprising:
a stepper motor controller being coupled to said stepper motor and being adapted for controllably rotating said stepper motor.

33. The milling machine, as set forth in claim 22, wherein said mechanism comprises:
a pneumatic or hydraulic cylinder having a piston longitudinally disposed therein, said piston being retractable and extendable and being coupled to said socket member.

34. The milling machine, as set forth in claim 22, further comprising:
a transducer being coupled to at least one of said plurality of second ball bearing assemblies, said transducer being adapted for delivering a signal, said signal having an attribute being correlative to a force being exerted by said at least one of said plurality of second ball bearing assemblies.

35. The milling machine, as set forth in claim 34, wherein said transducer is a pressure sensor.

36. The milling machine, as set forth in claim 22, wherein said plurality of second ball bearing assemblies comprise:
four second ball bearing assemblies being coupled to said upper arm portion of said C-shaped frame opposing said plurality of first ball bearing assemblies and being arranged in a rectangular configuration surrounding said cutting head.

37. The milling machine, as set forth in claim 22, further comprising:
a first transducer being coupled to at least one of said plurality of first ball bearing assemblies, said first transducer being adapted for delivering a first signal, said first signal having an attribute being correlative to a force being exerted on said at least one of said plurality of first ball bearing assemblies;
a second transducer being coupled to at least one of said plurality of second ball bearing assemblies, said second transducer being adapted for delivering a second signal, said second signal having an attribute being correlative to a force being exerted by said at least one of said plurality of second ball bearing assemblies; and
a control system being coupled to said first and second transducers to receive said first and second signals, said control system processing said attribute of at least one of said first and second signals and delivering a signal to cease operation of said milling machine in response to said attribute being correlative to a force outside of a preselected range.

38. The milling machine, as set forth in claim 37, wherein said first transducer is a strain gauge, and wherein said control system retracts said cutting head if said attribute of said first signal is correlative to a force that is less than a preselected force.

39. The milling machine, as set forth in claim 38, wherein said second transducer is a pressure sensor, and wherein said control system retracts said cutting head if said attribute of said second signal is correlative to a force that is less than a preselected force.

40. A milling machine, comprising:
a C-shaped frame having an upper arm portion and a lower arm portion;
a plurality of first roller members coupled to said lower arm portion of said C-shaped frame, said plurality of first roller members extending upwardly from said lower arm portion toward said upper arm portion, said plurality of first roller members being arranged in a planar configuration;
a cutting head being rotatably and slidably coupled to said upper arm portion of said C-shaped frame, said cutting head extending downwardly from said upper arm portion toward said lower arm portion, being rotatable about an axis, and being controllably retractable and extendable along said axis;
a containment ring disposed radially about said cutting head;
a plurality of second roller members coupled to said upper arm portion of said C-shaped frame, said plurality of second roller members extending downwardly from said upper arm portion toward said lower arm portion and being slidably moveable generally parallel to said axis;
a transducer being coupled to at least one of said plurality of second roller members, said transducer delivering a signal, said signal having an attribute being correlative to a force being exerted on said at least one of said plurality of second roller members; and
a control system being coupled to said transducer to receive said signal, said control system processing said attribute and retracting said cutting head into said containment ring in response to said attribute being correlative to a force outside of a preselected range.

* * * * *